(12) United States Patent
Dresen-Rausch et al.

(10) Patent No.: US 10,780,835 B2
(45) Date of Patent: Sep. 22, 2020

(54) INTEGRAL FOLDABLE HOOK ARRANGEMENT

(71) Applicant: FORD GLOBAL TECHNOLOGIES, LLC, Dearborn, MI (US)

(72) Inventors: Johannes Dresen-Rausch, Cologne (DE); Florian Klein, Frechen (DE); Florian Bonnet, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/380,676

(22) Filed: Apr. 10, 2019

(65) Prior Publication Data
US 2019/0315283 A1 Oct. 17, 2019

(30) Foreign Application Priority Data
Apr. 13, 2018 (DE) .................. 10 2018 205 626

(51) Int. Cl.
*B60R 7/10* (2006.01)
*B60R 11/00* (2006.01)

(52) U.S. Cl.
CPC ............... *B60R 7/10* (2013.01); *B60R 11/00* (2013.01); *B60R 2011/0003* (2013.01); *B60R 2011/0094* (2013.01)

(58) Field of Classification Search
CPC ........ B60R 7/10; Y10S 224/97; A47G 25/065
USPC ........................................ 224/313, 927, 549
See application file for complete search history.

(56) References Cited

U.S. PATENT DOCUMENTS

| | | | |
|---|---|---|---|
| 2,706,049 A * | 4/1955 | Andrews | B60R 7/10 224/482 |
| 3,385,547 A * | 5/1968 | West | B60R 7/10 248/308 |
| 5,475,577 A | 12/1995 | Vanderhoof et al. | |
| 6,076,233 A * | 6/2000 | Sasaki | B60N 3/026 16/438 |
| 8,490,935 B2 * | 7/2013 | Myers | B60R 7/10 248/308 |
| 9,266,477 B2 | 2/2016 | Huelke et al. | |
| 9,695,975 B2 * | 7/2017 | Ogawa | F16M 13/022 |
| 10,328,861 B2 * | 6/2019 | Gasca Fuentes | B60R 7/043 |

FOREIGN PATENT DOCUMENTS

| | | |
|---|---|---|
| EP | 2329992 A2 | 6/2011 |
| FR | 2340667 A7 | 9/1977 |

OTHER PUBLICATIONS

English Machine Translation of FR2340667A7 dated Sep. 2, 1977.

* cited by examiner

*Primary Examiner* — Adam J Waggenspack
(74) *Attorney, Agent, or Firm* — David Coppiellie; Price Heneveld LLP

(57) ABSTRACT

An integral hook arrangement for hanging accessories in a vehicle interior, has at least one hook element and an integral hook base. The integral hook base is designed as a single piece with the or each hook element and is connected pivotably via at least one live hinge such that the or each hook element can pivot from a folded-in stowed position into a folded-out operating position with an opening angle. The integral hook arrangement here has a stop element, wherein a removable abutment and/or engagement is or can be formed between the integral hook base and the or each hook element in order to limit the opening angle in the folded-out operating position.

20 Claims, 4 Drawing Sheets

Figure 3A:
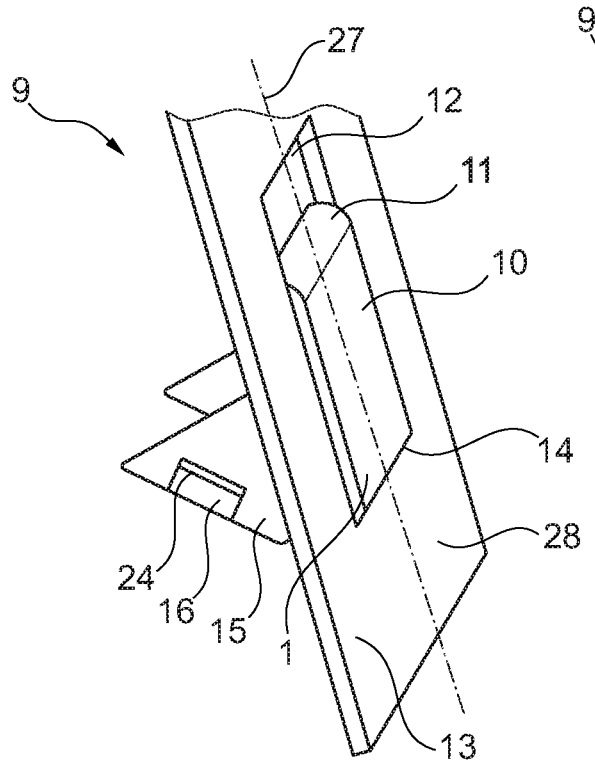

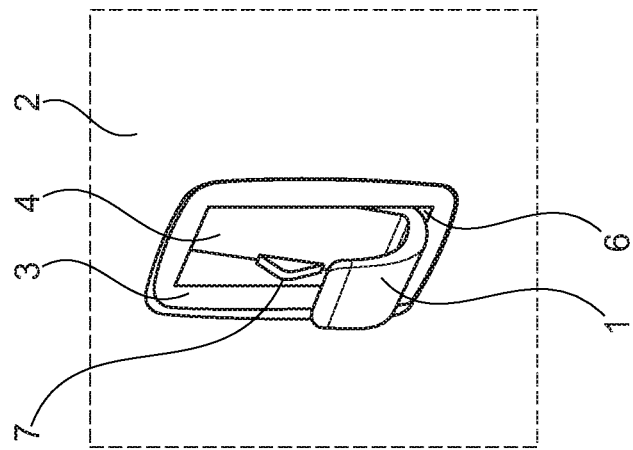
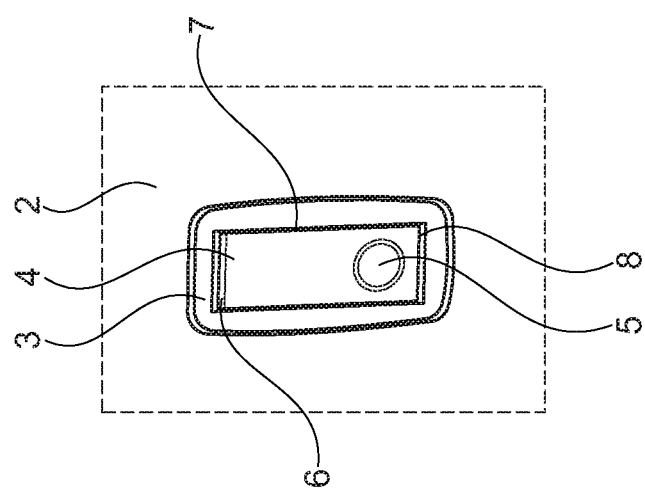
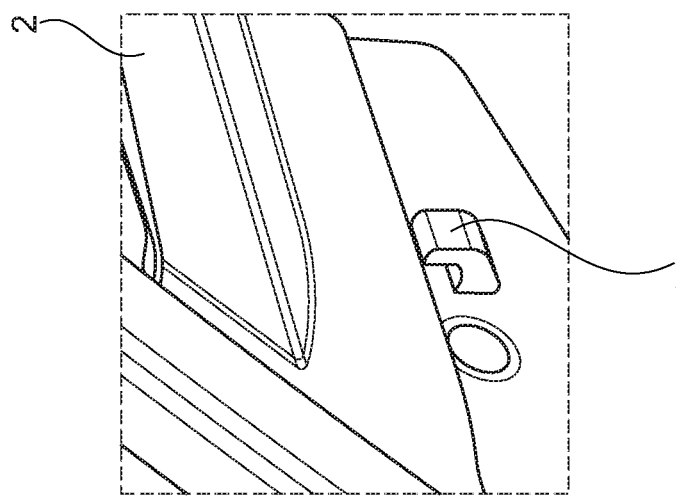

INTEGRAL FOLDABLE HOOK ARRANGEMENT

TECHNICAL FIELD

This document relates to an integral hook arrangement for hanging accessories in a vehicle interior.

BACKGROUND

Hooks or similar hanging devices in the interior of motor vehicles, on the one hand, make it possible to hang or store accessories (jackets, coats, shopping bags, handbags, etc) or similar objects and, on the other hand, enable quick and comfortable access to the stored objects when driving or immediately when getting out of the vehicle. There are essentially two options for designing these integral hooks:
1. Designing them as a single rigid part arranged immovably in the vehicle interior, wherein the hook cannot be folded in or folded away and thus reduces the interior space of the motor vehicle, in particular the storage space.
2. A fold-in/fold-out arrangement which consists of multiple components, for example the hook element, a pivot axis, and the mounting base.

Moreover, so-called live hinges, also known as film hinges, are known from the prior art. Live hinges are used in everyday life as, for example, a component of a closure element in plastic lids (for example, disposable salt shakers) and are usually made from plastic. A live hinge is here designed as a single piece with the two adjoining parts which are to be moved. By virtue of a linear thinned portion or an incision, pivotability about the linear thinned portion as an axis of pivoting is enabled. The hinges are furthermore characterized by a simple and cost-effective means of production. It is also possible to produce live hinges from wood.

The use of live hinges in the interior of vehicles is known in the automobile industry too. Thus, U.S. Pat. No. 5,475,577 A discloses a mounting plate for fastening accessories such as, for example, a vehicle light with a vehicle interior trim. The mounting plate is provided with a frame and an opening formed in the plate. The frame contains a clamping device which has a Z-shaped flange which is connected to the frame at an apex of a flange arm so that it can pivot about a live hinge, and is brought into engagement with the opposite side of the plate.

U.S. Pat. No. 9,266,477 B2 describes a plug-in clothes hook and the associated mounting arrangement for a vehicle interior. The mounting arrangement has a mounting bracket with a mounting orifice and retaining tabs which are connected to the mounting bracket at the mounting orifice so that it can pivot via a film hinge. The clothes hook has a hook section and an open frame section, wherein the open frame section is accommodated detachably in the mounting orifice of the mounting bracket during mounting.

FR 2340667 A7 discloses a clothes hook for a passenger compartment of a vehicle, consisting of a base which has an opening for receiving a fastening means and for fastening to the interior trim of the passenger compartment. A curved section which is formed at the upper end of the base forms the hook. At the lower end of the base, a cover is connected to a live hinge so that it can pivot via the latter. After mounting in the passenger compartment, the cover can pivot about the live hinge such that the opening and the fastening means are no longer visible.

A pivotable closure element in conjunction with a hook is also disclosed in EP 2 329 992 A2. The hook is designed integrally with an interior trim element of a motor vehicle, wherein an opening is arranged behind the hook, i.e. on the bodywork side. In order to cover the opening after the vehicle interior trim element has been installed, a closure element, which is likewise integrally formed in the trim element and can move by means of a live hinge, is latched into a position arranged parallel to and behind the hook.

Lastly, a clothes hook which can pivot via a live hinge is disclosed in U.S. Pat. No. 3,385,547. The clothes hook which is mounted flat against a vehicle bodywork bracket or side rail inside the passenger compartment and has a hook section which can pivot between a flat stowed position and a pulled-out operating position. Moreover, the clothes hook is formed from a flexible plastic and has an elastic flexural joint. The flexural joint is pretensioned such that it assumes its flat stowed position after use, i.e. when the tension is relieved, for example by removing the accessory. As a result, on the one hand, it is not possible to leave the hook in the operating position with no load applied, i.e. with no accessory hanging on it and, on the other hand, also only two positions are provided, the fully folded-in stowed position and the (only when a load is applied) fully folded-out operating position. Moreover, abutment means are provided in order to limit the movement of the hook section relative to the passenger compartment, wherein the abutment is produced to limit the maximum possible movement of the hook section with adjacent components of the passenger compartment, for example the roof trim. The hook section must thus be adapted as early as at the manufacturing stage to the predetermined geometry of the vehicle interior trim.

With respect to the described prior art, the space-saving arrangement of movable hook elements in the passenger compartment offers more room for improvements, in particular potential for less complex parts.

SUMMARY

It is an objective of this document to provide an improved hook arrangement. In particular, it is intended to keep the production cycles short for a simple manufacturing process and a simple mounting process, and consequently costs can be lowered, in particular compared with a multi-part hook arrangement.

This object is achieved by an integral hook arrangement for hanging accessories in a vehicle interior, having the features of the following claims.

It should be pointed out that, in the following description, individually described features and measures can be combined with one another in any technically appropriate manner, and even in asymmetric embodiments, and illustrate other embodiments. When components, in particular components such as the hook element, the integral hook guide element or the stop element, are mentioned individually, this explicitly includes the use of more than one of these components. The description additionally characterizes and specifies the integral hook arrangement in particular in conjunction with the drawings.

This document relates to an integral hook arrangement for hanging accessories in a vehicle interior, wherein the integral hook arrangement has at least one hook element and an integral hook base, wherein the integral hook base is designed as a single piece with the or each hook element and is connected pivotably via at least one live hinge such that the or each hook element can pivot from a folded-in stowed position into a folded-out operating position with an opening angle. The integral hook arrangement here has a stop element, wherein a removable abutment and/or engagement is or can be formed between the integral hook base and the or each hook element in order to limit the opening angle in the folded-out operating position.

The hook element can be pivoted from a folded-in stowed position into a folded-out operating position by an actuating means, for example engagement with a finger or a gripping element. The hook element is retained in the stowed position by means of the integral hook base integrally connected to said hook element, in particular by virtue of friction between the walls correspondingly abutting each other. So that the opening angle does not exceed the desired value in the operating position and make the hook element unusable, a stop element is provided which limits the opening angle to a maximum value. In the operating position with the maximum opening angle, this stop element forms an abutment and/or engagement with the integral hook base. Because this abutment and/or engagement is formed with the integral hook base, no additional component is necessary, which reduces the number of parts. There is no reliance on second components to fix the maximum permissible operating position. In order to move the hook element from the folded-out operating position into the folded-in stowed position, the abutment and/or the engagement is designed so that it is completely removable or reversible. Because the abutment is produced between integrally formed parts of the hook arrangement, the desired maximum opening angle can be fixed even without knowledge of the geometry of any receiving devices such as, for example, a vehicle interior trim.

In an advantageous embodiment of the integral hook arrangement, the or each hook element, the integral hook base, and the stop element are designed as a single piece. This is primarily achieved by the use of the live hinge which is typically arranged on the lower edge of the hook element. The live hinge is preferably designed without any specific pretensioning such that the position is or can be chosen solely by intervention by the user. The integral hook arrangement can here be fastened in the vehicle interior, for example in the passenger compartment or in the trunk, by means of the integral hook base, wherein the integral hook base itself can be a component of the interior trim and/or the interior panels and strips. By virtue of such a design, the number of parts and hence the costs can be further reduced.

As an optional development of the integral hook arrangement, the hook element has one or more integral hook guide elements which each connect the hook element to the stop element as a single piece. The integral hook guide element is arranged on the rear side of the hook element, i.e. on the wall which is opposite or faces the visible wall facing the vehicle interior. Moreover, an integral hook guide element is designed as an elongated and flat projection, on the end of which the stop element is arranged, as far away as possible from the hook element. As a result, the integral hook guide elements allow the hook element to pivot freely about the live hinge up to the maximum opening angle which in this design is predetermined by the distance between the hook element and the stop element. Two integral hook guide elements are particularly preferably arranged as flat projections parallel to each other and protruding perpendicularly from the hook element. These integral hook guide elements are moreover constantly in sliding contact with, or bearing flat against, the integral hook base in order to stabilize the hook element laterally during pivoting or when in use. As a result, the integral hook arrangement is particularly reliable and long-lived.

It is particularly advantageous if the stop element has a stop element contact wall for forming the abutment and/or engagement with the integral hook base. The stop element contact wall is here preferably designed as flat, for example with a rectangular cross-section. At the maximum opening angle, the stop element contact wall lies flat against the integral hook base, in particular against the rear side or rear wall of the integral hook base. As a result of this simple flat bearing contact, after use the hook can also be moved easily back into the folded-in stowed position. Alternatively or additionally, the abutment and/or engagement can also be designed with a reversibly detachable latching or snapping element.

In an optional development of the integral hook arrangement, the or each hook element can be snapped into the integral hook base for mounting for the first time. In the mounted state of the integral hook arrangement, the stop element is arranged in order to form the abutment behind the integral hook base, i.e. on a side of the latter facing the vehicle bodywork. After the integral hook arrangement is produced, for example by means of injection molding, the hook element is however situated on the opposite side of the integral hook base, i.e. that side facing the interior of the vehicle. When mounting for the first time, the stop elements therefore need to be guided through the base opening of the integral hook base. This is achieved with an elastic design of the stop element with a mounting bevel or slope, as a result of which the stop elements can be snapped or latched into the integral hook base. Simple and cost-effective mounting for the first time in a single step is consequently enabled.

In a development, the integral hook arrangement has one or more intermediate positions with respective opening angles smaller than the maximum opening angle. As a result, additional operating positions are possible, in particular operating positions for small light accessories, for example a small bag, are possible without unnecessarily taking up a lot of space in the vehicle interior.

As an option, the intermediate stop element or elements is or are arranged on the integral hook guide elements and/or a base opening inner surface. For this purpose, the intermediate stop elements can be designed as small projections which provide sufficient resistance when there is a slight pressure or pulling force but, when deliberately activated by a user, can be shifted into the nearest operating position and/or the stowed position.

In a further preferred embodiment, the integral hook arrangement, i.e. one or more hook elements, the integral hook base, the live hinge, and one or more stop elements, can be shaped and/or produced in a single manufacturing step. In principle, all production methods for the forming or reshaping are conceivable, for example injection molding or 3D printing. As a result, additional assembly steps can be dispensed with which would be required for a multi-part design, whereby the production cycles are shortened and the associated costs for the hook are lessened significantly compared with a multi-part arrangement. Furthermore, the design can consequently be integrated very simply in components of the interior trim or in decorative components of the vehicle interior.

The hook element can moreover be mounted by rotation or pivoting about a live hinge and by being clipped, latched, or snapped into or to a base opening. If the integral hook arrangement is manufactured in one production step, the stop elements must be arranged accordingly in order to engage behind the integral hook base so that they can form an abutment and/or engagement in the operating position. This is achieved by the stop elements being guided through the base opening by means of a pivoting movement of the hook element, thus bending elastically and latching or snapping into place by means of a resiliently elastic snapping movement. This mounting step can be performed very simply by hand or machine and can be carried out immediately after the integral hook arrangement has been produced.

BRIEF DESCRIPTION OF THE DRAWING FIGURES

Figure 3B:
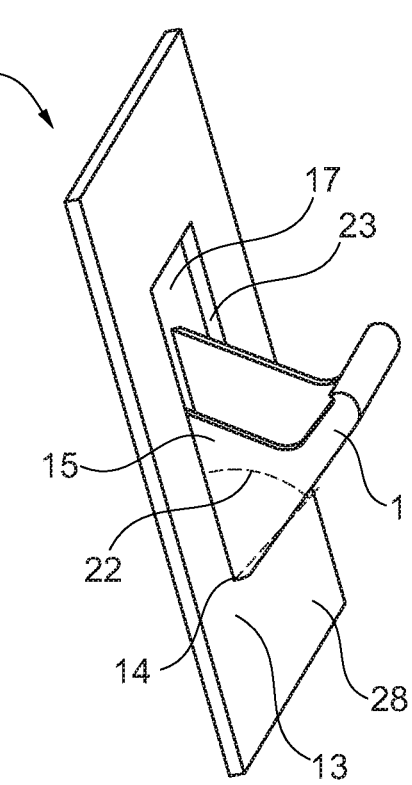
Figure 3C:
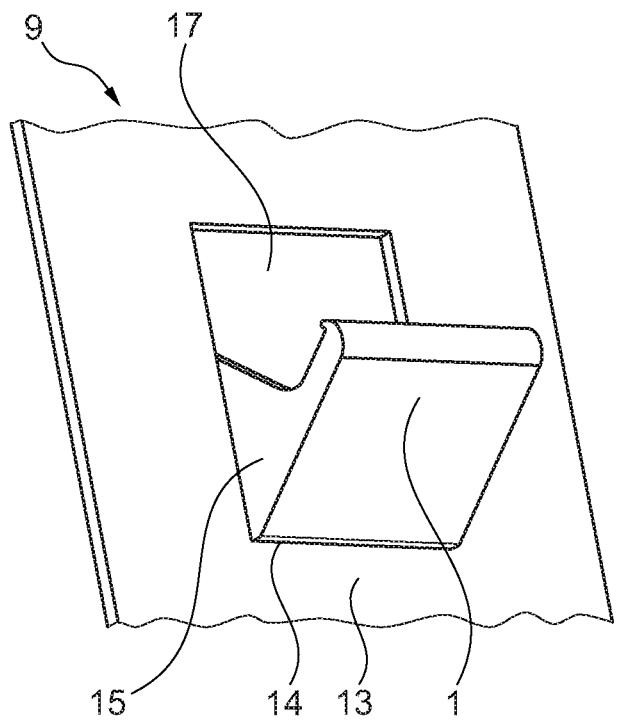
Figure 3D:
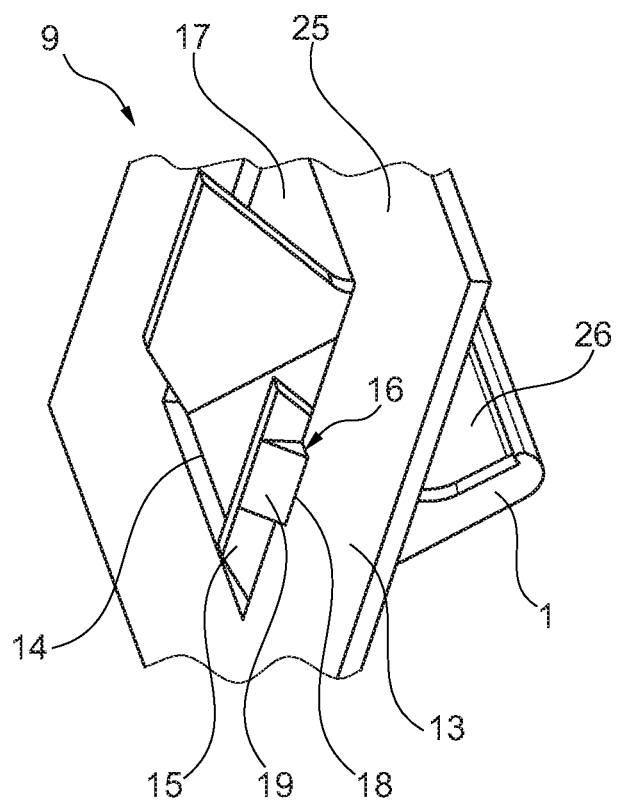
Figure 4:
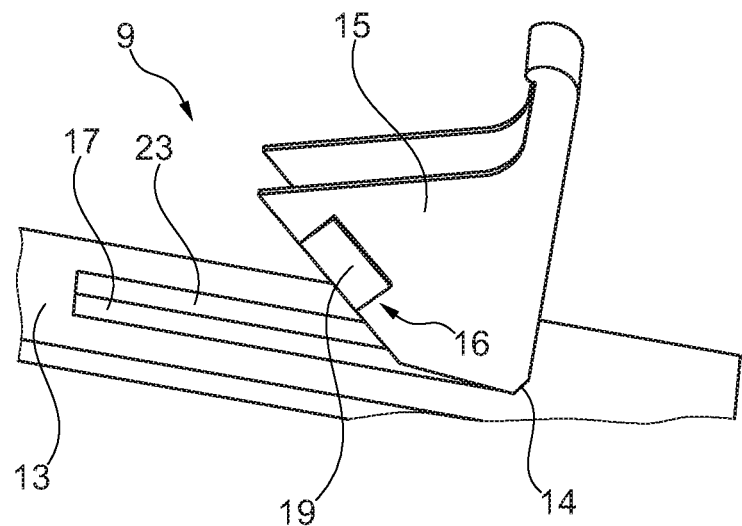
Figure 5:
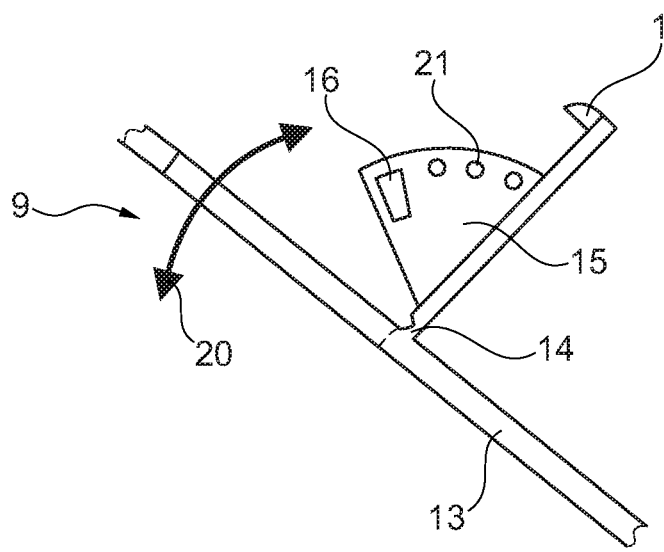

Advantageous embodiments of the new and improved integral hook arrangement are disclosed in the following description of the drawings, in which:

FIG. 1 shows a perspective view of a single-piece rigid hook element on the interior trim of a vehicle interior according to the prior art, FIG. 2a shows a perspective view of a multi-part hook arrangement in the operating position according to the prior art, FIG. 2b shows a perspective view of a multi-part hook arrangement in the operating position according to the prior art, FIG. 3a shows a perspective view of an exemplary embodiment of an integral hook arrangement in a stowed position, FIG. 3b and FIG. 3c show a perspective view of an exemplary embodiment of an integral hook arrangement in an operating position, FIG. 3d shows a perspective view of an exemplary embodiment of an integral hook arrangement in an operating position (rear view), FIG. 4 shows a perspective view of an exemplary embodiment of an integral hook arrangement before it is mounted for the first time, and FIG. 5 shows a schematic side view of an exemplary embodiment of an integral hook arrangement before it is mounted for the first time.

DETAILED DESCRIPTION

In the various drawings, identical parts are always provided with the same reference numerals, as a result of which they are generally also only described once.

FIG. 1 shows a rigid hook element 1 from the prior art, which is designed as a single piece with components of the interior trim 2 of the vehicle interior. The high stability of this design and the ease of production are advantageous. A disadvantage of this design is that the hook element 1 takes up unnecessary storage space in the passenger compartment or the trunk when not in use.

In contrast, FIG. 2a shows a multi-part hook arrangement from the prior art in a folded-in stowed position. The hook element 1 (cf FIG. 2b) is here concealed in the interior trim 2 of the vehicle interior in the stowed position when not in use such that it does not use up any of the vehicle interior. Instead, the hook element 1 (cf FIG. 2b) is surrounded, enclosed, or bordered by a base 3. Only a guide element 4 is visible to an observer, wherein it has an activating element 5, for example a gripping surface or a finger slot. When the activating element 5 is activated, the guide element 4 can be rotated about a pivot axis 7, usually oriented horizontally, until a stop element 6, in this case a bevel, makes contact with the base 3 on an abutment surface 8 and ends the rotational movement in the operating position.

FIG. 2b shows this multi-part hook arrangement from the prior art in the operating position, wherein the hook element 1 can be used for accessories. By virtue of the multi-part design, at least the base 3, the hook element 1, and the pivot axis must be assembled and then mounted in the interior trim 2 of the passenger compartment or the trunk.

FIG. 3a shows an integral hook arrangement 9 with a hook element 1, wherein the hook element 1 has an approximately rectangular visible wall 10 which faces the vehicle interior and, in the stowed position shown, is arranged approximately flush with a base front wall 28 of an integral hook base 13. The hook element 1 has a curved front edge 11 which interacts with a gripping slot 12, which is formed between the front edge 11 and the integral hook base 13, as an activating element such that the hook element 1 can be pivoted from the stowed position into the operating position by engaging a finger in the gripping slot 12. The pivotability is provided by a live hinge 14 which takes the form of a linear depression or thinning of the material between the hook element 1 and the integral hook base 13. The live hinge 14 is consequently arranged essentially horizontally and below the hook element 1. On a hook element rear wall (cf FIG. 3d) which is arranged opposite the visible wall 10, two integral hook guide elements 15 are arranged and oriented so that they are essentially parallel to each other and protrude perpendicularly from the hook element rear wall 26 (cf FIG. 3d). The integral hook guide elements 15 are moreover arranged symmetrically with respect to an axis of symmetry/center axis 27. A stop element 16 for each integral hook guide element 15 is likewise formed symmetrically with respect to this axis of symmetry/center axis 27 and at a distance from the hook element 1. Such a stop element 16 has a contact wall 24.

FIG. 3b and FIG. 3c show the integral hook arrangement 9 with a hook element 1 in the operating position. The stop elements 16 are situated at the abutment and/or engagement 18 with the base rear wall 25 (not shown, cf FIG. 3d). The visible wall 10 (cf FIG. 3a) and the base front wall 28 enclose an opening angle 22 which is at its maximum at the abutment and/or engagement 18 (cf FIG. 3d). The vertex of the opening angle 22 approximately coincides with the pivot axis of the live hinge 14. The integral hook base 13 has a base opening 17 through which the integral hook guide elements 15 extend which can be displaced, bearing flat against a base opening inner wall 23 and sliding thereon.

FIG. 3d shows the integral hook arrangement 9 in the operating position in a rear view, i.e. in a view which is concealed to a vehicle occupant after installation in the passenger compartment 2 (cf FIG. 1). Visible are the stop elements 16, the flat contact wall 24 of which (cf FIG. 3a) forms an abutment and/or engagement 18 with the integral hook base 13. This is achieved by the stop element 16 bearing flat against the base rear wall 25. The stop element 16 moreover has a mounting bevel 19 which is required, when mounting for the first time, for the passage of the stop elements 16 through the base opening 17 so that the stop elements 16 can engage behind the integral hook base 13 (cf FIGS. 4 and 5).

FIG. 4 shows the integral hook arrangement 9 after it has been completely produced but before being mounted for the first time. To mount it for the first time, the hook element 1 needs to be pivoted about the live hinge 14 toward its stowed position. The mounting bevel 19 serves to allow the passage of the stop elements 16 through the base opening 17. By virtue of the slopes of the mounting bevel 19, the integral hook guide elements 15 bend elastically toward the center axis/axis of symmetry 27 (cf FIG. 3a) as a result of the contact of the mounting bevel 19 with the base opening inner walls 23. As soon as the stop elements 16 have passed the base opening 17, the integral hook guide elements 15 snap back into their starting position, as a result of which the stop elements 16 engage behind the integral hook base 13. The stop elements 16 virtually latch into place. This mounting step is not reversible. The stop elements 16 cannot pass the base opening 17 again in the other direction, whereby the hook element 1 is securely retained (by abutment and/or engagement 18) in the operating position.

FIG. 5 likewise shows the integral hook arrangement 9 after it has been completely produced but before being mounted for the first time. The directions of the arrows indicate the pivoting direction 20 of the hook element 1 about the live hinge 14. In order to fix further operating positions, intermediate stop elements 21, which can be brought into reversible, i.e. removable, abutment and/or engagement with the integral hook base 13, are arranged on the integral hook guide elements 15 symmetrically with respect to the center axis/axis of symmetry. These intermediate stop elements 21 are formed, for example, as small round protrusions which, in an appropriate position with respect to the integral hook base 13, provide a certain resistance and allow accessories to be hung. However, the resistance is not very pronounced so that it is possible for the intermediate stop elements 21 to be able to pass through the base opening 17 (cf FIG. 4) in both pivoting directions 20 with a corresponding exertion of force, for example by hand. The intermediate stop elements 21 can of course alternatively or additionally be arranged on the base opening inner wall 23 (cf FIG. 4).

What is claimed:

1. A hook arrangement for hanging accessories in a vehicle interior, comprising:
    at least one hook element and a hook base, wherein the at least one hook element and the hook base are a single piece and the at least one hook element is connected pivotably to the hook base via at least one live hinge, whereby the at least one hook element can pivot from a folded-in stowed position into a folded-out operating position with an opening angle;
    a pair of parallel hook guide plates extending perpendicular to the at least one hook element; and
    a stop element extending outward from the pair of hook guide plates to engage the hook base in the folded-out operating position in order to limit the opening angle in the folded-out operating position.

2. The hook arrangement as claimed in claim 1, wherein the at least one hook element, the hook base, and the stop element are a single piece structure.

3. The hook arrangement as claimed in claim 2, wherein the pair of hook guide plates connect the at least one hook element to the stop element.

4. The hook arrangement as claimed in claim 3, wherein the stop element has an angled ramp surface and a stop element contact wall forming the engagement with the hook base.

5. The hook arrangement as claimed in claim 4, wherein the at least one hook element is configured to be snapped into the hook base before it is mounted for a first time.

6. The hook arrangement as claimed in claim 4, further comprising one or more intermediate stop elements fixing one or more intermediate positions.

7. The hook arrangement as claimed in claim 6, wherein the one or more intermediate stop elements are arranged on the pair of guide plates.

8. The hook arrangement as claimed in claim 7, wherein one or more hook elements, the hook base, and one or more stop elements are formed in a single manufacturing step.

9. The hook arrangement as claimed in claim 7, wherein the at least one hook element is configured to be mounted by pivoting about a live hinge and by latching or snapping into or to a base opening.

10. The hook arrangement as claimed in claim 6, wherein the one or more intermediate stop elements are arranged on a base opening inner wall.

11. The hook arrangement as claimed in claim 10, wherein the at least one hook element, the hook base, and the one or more stop elements are formed in a single manufacturing step.

12. The hook arrangement as claimed in claim 11, wherein the at least one hook element is configured to be mounted by pivoting about a live hinge and by latching or snapping into or to a base opening.

13. The hook arrangement as claimed in claim 1, wherein the hook guide plates connect the at least one hook element to the stop element.

14. The hook arrangement as claimed in claim 13, wherein the stop element has an angled ramp surface and a stop element contact wall forming the engagement with the hook base.

15. The hook arrangement as claimed in claim 14, wherein the at least one hook element is configured to be snapped into the hook base before it is mounted for a first time.

16. The hook arrangement as claimed in claim 14, wherein one or more stop elements fix one or more intermediate positions.

17. The hook arrangement as claimed in claim 16, wherein the one or more intermediate stop elements are arranged on the hook guide plates.

18. The hook arrangement as claimed in claim 17, wherein the at least one hook element, the hook base, and the one or more stop elements are formed in a single manufacturing step.

19. The hook arrangement as claimed in claim 18, wherein the at least one hook element is configured to be mounted by pivoting about a live hinge and by latching or snapping into or to a base opening.

20. The hook arrangement as claimed in claim 1, wherein the stop element has an angled ramp surface and a stop element contact wall forming the engagement with the hook base.

* * * * *